United States Patent [19]

Dall

[11] Patent Number: 5,347,753
[45] Date of Patent: Sep. 20, 1994

[54] DEGRADATION RESISTANT MOLDED PULP HORTICULTURAL CONTAINER

[75] Inventor: Paul E. Dall, Sidney, Me.

[73] Assignee: Keyes Fiber Co., Waterville, Me.

[21] Appl. No.: 773,346

[22] Filed: Oct. 7, 1991

Related U.S. Application Data

[63] Continuation-in-part of Ser. No. 652,946, Feb. 8, 1991, abandoned.

[51] Int. Cl.$^5$ .......................... A01G 9/10; A01G 13/00
[52] U.S. Cl. .............................................. 47/66; 47/74
[58] Field of Search ........................................ 47/66, 74

[56] References Cited

U.S. PATENT DOCUMENTS

| | | | |
|---|---|---|---|
| 1,331,261 | 2/1920 | Hornsby | 47/74 |
| 1,827,700 | 10/1931 | Kirschbraun . | |
| 1,993,620 | 3/1935 | Otwell . | |
| 2,025,548 | 11/1935 | Otwell . | |
| 2,204,066 | 6/1940 | Boller et al. . | |
| 2,728,169 | 12/1955 | Spengler et al. . | |
| 2,738,914 | 3/1956 | Hatch . | |
| 2,767,088 | 10/1956 | Crandall . | |
| 2,780,546 | 2/1957 | Moyle et al. . | |
| 2,814,427 | 11/1957 | Emery . | |
| 2,858,647 | 11/1958 | Cotton | 47/74 |
| 3,027,684 | 4/1962 | Keiding . | |
| 3,102,364 | 9/1963 | Pullen . | |
| 3,154,884 | 11/1964 | Amar et al. | 47/74 |
| 3,187,463 | 6/1965 | McCollough et al. | 47/74 |
| 3,264,172 | 8/1966 | Glenshaw . | |
| 3,315,410 | 4/1967 | French | 47/66 |
| 3,318,659 | 5/1967 | Bullock et al. . | |
| 3,463,785 | 8/1969 | Buckman . | |
| 3,520,976 | 7/1970 | Buckman | 47/74 |
| 3,521,624 | 7/1970 | Gander et al. . | |
| 3,755,964 | 9/1973 | Rack | 47/74 |
| 3,785,088 | 1/1974 | Guarriello . | |
| 3,842,537 | 10/1974 | Bishop | 47/74 |
| 3,921,333 | 11/1975 | Clendinning et al. | 47/74 |
| 4,022,115 | 5/1977 | Greenwich | 47/74 |
| 4,057,932 | 11/1977 | Spencer . | |
| 4,517,764 | 5/1985 | Dedolph | 47/74 |
| 4,866,080 | 9/1989 | Hollis et al. . | |
| 5,119,588 | 6/1992 | Timmis et al. | 47/73 |

FOREIGN PATENT DOCUMENTS

| | | | |
|---|---|---|---|
| 1221484 | 7/1966 | Fed. Rep. of Germany | 47/74 |
| 5-576806 | 6/1980 | Japan . | |
| 603248 | 8/1960 | United Kingdom . | |

*Primary Examiner*—Carl D. Friedman
*Assistant Examiner*—Wynn E. Wood
*Attorney, Agent, or Firm*—Connolly & Hutz

[57] ABSTRACT

A horticultural container is disclosed which is composed of molded pulp fiber and which contains an organic thiocyanate microbicide, the container being resistant to degradation when exposed to soil burial or greenhouse conditions.

32 Claims, No Drawings

DEGRADATION RESISTANT MOLDED PULP HORTICULTURAL CONTAINER

This is a Continuation in Part of application Ser. No. 652,946, filed Feb. 8, 1991 now abandoned.

FIELD OF THE INVENTION

The invention relates to the field of molded pulp fiber containers, and in particular, to molded pulp fiber containers for horticultural use. In accordance with the invention, molded pulp horticultural containers are rendered resistant to degradation and deterioration under greenhouse and/or soil burial conditions.

BACKGROUND AND PRIOR ART

Molded pulp fiber containers are useful and popular for horticultural applications, such as the propagation of cuttings or seedlings, or as receptacles for flowers, plants or trees. Often plants are germinated or started in containers in a controlled environment and later transplanted. Also, plants are moved, within a container, from one ground site to another. One advantage of molded pulp containers in these types of uses is the fact that, over time, they will degrade in the ground. A plant started in a pulp container may later be transplanted to a different location in the ground or to another container, and the plant roots eventually penetrate through the container into the surrounding medium. Plastic horticultural trays, which do not degrade and are not root-penetrable, are undesirable to many users for this reason.

Molded pulp containers are disclosed in, for example, U.S. Pat. Nos. 2,858,647; 2,814,427; and 3,315,410. One type of product which is now in use comprises a tray-type horticultural container consisting of a number of detachable individual containers, each container being about 1 inch to 3 inches in size, wherein the tray has been molded as an integral unit.

In the greenhouse, in the germination environment, or in the ground, conditions exist which tend to prematurely degrade molded pulp and thereby cause a loss of structural strength in the container. Of course, eventual degradation of the pulp in the ground is desireable, but premature degradation in the greenhouse is preferably avoided. In the greenhouse, for example, warm and moist conditions tend to favor microbial proliferation on horticultural containers. In soil, when a container is buried, moist and nutrient-rich conditions similarly tend to promote microbial growth. In each of these environments, the pulp container is often soaked to full saturation. It is desirable, however, to maintain the structural integrity of the container in these conditions over extended time periods prior to permanent planting or retail potting, normally from 1–8 weeks, in order to facilitate handling and transplanting of the container contents.

Several approaches have been pursued in the prior art to improve the strength of molded pulp containers under greenhouse or soil burial conditions by preventing premature decomposition. One approach has been to thicken the walls and bottom of the container. This adds weight and bulk to the container, however, and does not avoid degradation to any significant extent. A different approach has been to design drainage ports into the container, with a view towards preventing water retention within the container interior. See, for example, U.S. Pat. No. 3,027,684. The most common approach, however, is to incorporate significant quantities of asphalt, such as bitumen, into the pulp fiber furnish to provide resistance against wetting in the final container. Molded pulp products which are currently available for horticulture normally contain between 10 and 30% by weight asphalt. Incorporation of such amounts of asphalt into the product molded pulp fiber container is advantageous in terms of improving the useful life of the container, but a number of disadvantages are associated with the use of asphalt. For example, asphalt is a costly component, and its use adds significantly to the cost of production. Also, the use of asphalt makes the manufacture of containers very heat-intensive, for the reason that when asphalt is added to a fiber furnish, it must be melted and flowed onto the fibers in order to be effective. In addition, any system to which asphalt is to be added must be set up as a separate stock system, white water system, machine and dryer. Further, the tackiness of the asphalt makes it difficult to mold an article having thin walls or complex shape. For these reasons, it would be desirable to eliminate, or reduce the amount of, asphalt from the molded pulp furnish yet retain satisfactory resistance against deterioration.

The prior art has recognized the benefit of incorporating a fungicide into pulp to prepare paper or paper products. U.S. Pat. No. 2,767,088 teaches the preparation of moldproof paper by the formation of an insoluble copper salt in the beater solution, which salt is said to be effectively retained by the paper fibers in the formed web. U.S. Pat. No. 2,858,647 teaches a pulp container prepared by adding a copper naphthenate solution to the pulp in the beater, which container resists decomposition in soil. Other patents showing paper having an antimicrobial agent incorporated therein includes U.S. Pat. Nos. 2,780,546; 2,204,066; 3,264,172; and U.K. Pat. No. 603,248.

It is noted that, due to environmental considerations and existing regulations, copper salts often cannot be used in molded pulp horticultural containers.

In the case of transplantable containers, it is desireable that the container be root-penetrable, so that the roots of a growing plant or seedling can penetrate the walls or bottom of the container and enter the surrounding medium after transplantation. Root penetration can be facilitated by providing openings such as holes or slots in the container. See, for example, U.S. Patent Nos. 3,785,088; 2,022,548 and 1,993,620. Another known means of providing root-penetrability is to form the container from a low-strength material, such as peat, which permits root penetration. See, e.g. U.S. Pat. Nos. 3,102,364; 2,728,169 and 3,187,463. Peat can be desireable for the reason that it tends to resist decomposition. In the art, peat has been used either alone or with paper pulp fibers present as a binder. Although peat is useful in a transplantable container in terms of its low burst strength properties and low tendency to degrade, use of peat adds difficulty and expense to the manufacturing operation. Peat pots also support mold and fungal growth under greenhouse conditions. Moreover, peat has a very low web-strength and cannot be easily shaped into small containers or containers of complex geometry. It would be desireable to provide a low burst strength, root-penetrable transplantable container which is not based on peat and contains little or no peat.

In current practice, many plants including flowering plants, agricultural crops and trees are germinated or started under carefully controlled conditions to assure optimal growth prior to transplanting. In large commercial operations, individual seeds are germinated and started in multi-cell plug propogation trays. These trays are typically made from plastic, for example polystyrene, and are not reused. The trays facilitate the transfer of the seedlings from one growth environment to another during different growth stages. These growth environments, like greenhouse conditions, are normally hot, humid and conducive to microbial proliferation. When the root system has sufficiently developed, the "plug" is mechanically or manually transferred to a retail pot or to the ground. It should be appreciated that this transfer step exposes the plant to potential transplant shock, and also requires that transfer be delayed until the root system of the seedling is relatively well-developed in the plug. Moreover, plastic is impermeable to gas and moisture, making these variables difficult to control when using a plastic propogation tray.

An alternative propogation system to plastic plug propogation trays are the solid transplantable media systems, such as compressed peat, Rock Wool, and the like. Although transplantable, these systems are not cost effective for many uses.

SUMMARY OF THE INVENTION

With the foregoing state of the art in mind, it is an object of the invention to provide a molded fiber pulp horticultural container which has relatively thin side and bottom walls yet is capable of maintaining its strength under greenhouse, soil burial or germination conditions.

It is a further object of the invention to provide a root-penetrable molded fiber pulp horticultural container which is resistant to microbial-induced deterioration, whether or not the pulp additionally contains a sizing.

It is a further object of the invention to provide a molded fiber pulp horticultural container which is free of asphalt or contains a reduced amount of asphalt.

It is a further object of the invention to provide a molded pulp plug propogation tray which shows controlled degradation under germination or early growth stage conditions.

It is a further object of the invention to provide a process for preparing a molded fiber pulp horticultural container wherein a microbicide is added to the furnish at the wet end and is effectively retained on the fibers in the furnish slurry and in the fiber container as the container is formed by suction molding.

The aforesaid objectives have been realized, in accordance with the invention, by providing in a molded fiber pulp horticultural container an antimicrobial effective amount of an organic thiocyanate microbicide. Surprisingly, microbicides of this type are well retained in the final molded pulp article when added at the wet end of the manufacturing operation. Specifically, the microbicides comprise S-thiocyanomethyl derivatives of 2-mercaptobenzothiazoles, 2-mercaptobenzoxazoles, or 2-mercaptobenzimidazoles. Antimicrobial effective amounts which are particularly preferred are between 500 and 3000 parts per million of microbicide based on parts of molded fiber in the finished article. A particularly preferred microbicide within the above class is 2-(thiocyanomethylthio) benzothiazole.

In accordance with the process aspect of the invention, a dispersion of the microbicide in solvent is added to and mixed with an aqueous fiber furnish in the presence of a retention aid. Optionally, a sizing agent is also added to the furnish. It has been found that the organic thiocyanate is well retained in the fiber article produced from the furnish.

The containers of the invention show improved longevity under greenhouse, germination or soil burial conditions, as determined by the absence of microbial growth and the maintenance of structural strength.

DETAILED DESCRIPTION OF THE INVENTION

Molding processes for forming pulp fiber articles from an aqueous fiber dispersion are well known in the art and are not described in detail. Briefly, a fiber dispersion, which is referred to in the art as the "furnish" or "beater", is prepared, and the fibrous pulp is picked up from the dispersion by a vacuum action, such as an open-faced suction mold, and formed to the intended contoured shape. The furnish solution used in the invention may be any type of chemical or mechanical pulp fiber furnish, of any grade, but for reasons of availability and economy, a newsprint-based pulp furnish is preferred for horticultural use. One type of process suitable for use in connection with the invention is known in the art as "slush molding". One advantage associated with the practice of the present invention, however, is the ability to produce containers on multi-transfer molding machines. Most currently available commercial products are produced by direct-transfer slush molding due to the need for thick-walled containers, in the range of 0.1 to 0.3 inches in thickness, and due to the presence of asphalt in the furnish. Products according to the invention made on high speed machinery can be produced having thin walls and complex geometry not attainable using slush molding.

As used herein, "molded pulp" refers primarily to molded paper pulp fiber, most preferably newspaper-derived paper pulp, but can also refer to non-paper fibers. A container composed entirely of paper pulp is currently preferred. It may be desireable to use other types of fibers, however, to modify the strength, porosity and/or density properties of the pulp fiber container. Non-paper fibers such as vegetable fibers may be used to form the pulp container, or may be used together with paper pulp to form a container which is comprised of both paper and non-paper fibers.

One of the discoveries underlying the present invention is the recognition that microbial growth is a more immediate cause of degradation and loss of strength than wetting, and can be independent of wetting. Applicant has surprisingly found that structural strength of a horticultural container is maintained under greenhouse, germination or soil burial conditions even if the container is wet, provided that microbial growth is inhibited. While not intending to be limited by any theory, it is currently believed that microbial growth is somehow related to wetness-induced structural failure. The recognition that inhibition of microbial growth, without conventional waterproofing steps or designs, is capable of preserving container strength, enables several important manufacturing and product considerations to be realized. For example, the large amounts of asphalt added by most commercial producers of molded fiber horticultural containers can be omitted or greatly reduced. As noted, omission or reduction of the asphalt content of the container is desirable for several reasons. It may be desirable, however, to retain the presence of reduced quantities of asphalt, usually less than 5% by weight, as a sizing in the furnish.

In addition, a container may be formed to have relatively thin walls. In the art, container thickness has been a compensation for a perceived lack of functional strength in thin-walled containers, and for that reason, commercially available products have relatively thick walls, normally on the order of 0.1 to 0.3 inches. In accordance with the invention, containers are formed having relatively thin walls, preferably less than 0.1 inches, and most preferably between 0.03 and 0.1 inches (30–100 mils). Surprisingly, these thin-walled structures according to the invention hold up well when exposed to severe greenhouse conditions, germination conditions or soil burial conditions.

The preferred class of microbicide useful in carrying out the present invention are S-thiocyanomethyl compounds of 2-mercaptobenzothiazoles, 2-mercaptobenzoxazoles, or 2-mercaptobenzimidazoles. This class of compounds is described, and methods for preparation of the compounds are disclosed, in U.S. Pat. Nos. 3,463,785 and 3,520,976. The disclosure of each of these patents is incorporated by reference as if set forth fully herein. Briefly summarizing what is therein disclosed, the organic thiocyanates suitable for use in the invention may be represented by the general formula

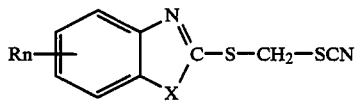

wherein X is O, NH, or S; R is hydrogen, halogen, nitro, alkyl, amino, or hydroxyl; and n is 1 or 2.

A particularly preferred compound within the above class is 2-(thiocyanomethylthio) benzothiazole. This compound is commercially available in the form of a 30% by weight dispersion in inert solvent under the tradename Busan 1030 from Buckman Laboratories, Inc., Memphis, Tenn. Busan 1030 has been used in the paper industry to control slime in pulp and paper mills by periodic addition to, for example, the stock pump or the pulper. It has also been applied to paper and paperboard as an aftercoating to provide mold-resistance. One beneficial aspect of the present invention is that after-treatment of the molded container is not necessary.

In accordance with the invention, the microbicide is added at the wet end of the production operation, i.e. it is added to and admixed with the aqueous fiber dispersion. Surprisingly, this class of organic thiocyanate microbicides is well retained by the fibrous pulp as the furnish is formed into a three-dimensional container shape, for example by drawing the pulp into a suction mold. First pass retention of up to 60%, and reliably between 50 and 60%, of the microbiocide added to the furnish is achieved, as determined by high pressure liquid chromatographic analysis of the containers. It is also noted that Busan 1030 is approved by the U.S. Food and Drug Administration for use as a slimicide in the manufacture of paper and paperboard food packaging. A pulp fiber furnish containing this material is therefore widely compatible with other furnishes. As a consequence, the process of the invention does not require the use of a separate stock system, white water system, machine, and dryer. Moreover, broke can be reclaimed in the process rather than discarded.

An amount of microbicide is added to the furnish so as to provide an antimicrobial effective amount of the microbicide in the final molded container. The amount to be added to the furnish will depend on a number of factors, such as the concentration of the microbicide solution being added and the degree of retention being achieved. In the currently preferred embodiment, the final content of microbicide in the final container is between about 450 to 2000 parts per million (ppm) of organic thiocyanate based on parts fiber, but may be as high as 3000 parts per million or higher under severe greenhouse conditions. The final container content of 450–3000 ppm can be achieved when between 6 and 40 pounds, and more preferably between 6 and 30 pounds, of Busan 1030 is added per one ton of news-based furnish. Assuming 50% retention, addition of 6 pounds of Busan 1030, which is the equivalent of adding 1.8 pounds of the active antimicrobial ingredient 2-(thiocyanomethylthio) benzothiazole, gives about 450 ppm of active ingredient in the final container. Similarly, addition of 20 pounds of Busan 1030 per ton of furnish results in 1500 ppm of active ingredient in the container, and addition of 40 pounds of Busan 1030 per ton of furnish results in 3000 ppm of active ingredient in the container. The proportion of microbicide in the final article can vary from these parameters, however, and an antimicrobial-effective amount of organic thiocyanate for a given end use application can be readily determined.

In addition to the microbicide, other components may optionally be added to the furnish. For example, a sizing such as rosin, wax or asphalt or combinations thereof may be included. Sizing is normally added to about 1–5% by weight based on weight of total furnish. Customary retention aids or substantive agents may also be included, for example fillers, alum, pigments, colorants, dyes, polymers or resins such as wet strength resins or binder resins, or adhesives. Alum is a particularly preferred retention aid, which has been found to enhance retention of the organic thiocyanate in the molded fiber. Examples of preferred wet-strength resins are urea-formaldehyde, melamine-formaldehyde, and polyamide or polyamine.

In a preferred embodiment of the invention, the transplantability of the container of the present invention is enhanced by making the container root-penetrable. Preferably, this is accomplished using one or both of two means. First, the container may be provided with openings, such as slots or holes, which direct root growth from the container without root spiraling. Slots may be molded into or cut into the container walls, corners and/or bottom. This means of providing root-penetrability is particularly applicable when the container is prepared from 100% news-based furnish, and the resulting molded pulp container will eventually degrade but has a relatively high burst strength. Testing has shown that such openings significantly enhance root growth after transplanting. Second, the wall strength (burst strength) of the container may be reduced by using a low bond strength fiber material in the fibrous pulp. As noted, molded paper pulp from 100% news-based furnishes is generally strong, and the fibers are densely held together by interactions between fibers such as hydrogen bonding. These properties are desireable in terms of providing a stable container framework, but such wall strength can work against root-penetrability. This problem can be overcome by using a low bond strength fiber material. By replacing the paper pulp fibers in whole or in part by low bond strength fibers, the wall strength of the container can be decreased until its root-penetration characteristics are comparable to those of a peat-based container. Use of low bond strength fiber may also increase porosity, but as the invention is presently understood, low strength is a more important factor to achieving root-penetrability than is high porosity. Suitable low bond-strength fibers include, for example, coarse mechanical fiber, such as refiner mechanical pulp or ground wood refiner-type pulp, glass fiber such as rock wool, synthetic fibers, vegetable or plant fibers such as straw, bagasse or hemp, peat, or the like. Increasing the proportion of low bond-strength fibers lowers the container burst strength and facilitates root-penetration. It is noted that, when low bond-strength, open fibers are present in the furnish, it may be necessary to increase the amount of microbiocide added to the furnish to achieve the desired level of retention in the fiber as the container is formed.

The container of the invention may take any form in common use in floriculture, agriculture or forestry. For example, individual containers in the form of small pots may be round or square in configuration and be formed to any desired size or depth, depending on the intended use. Drainage slots or root-penetrable openings may be molded or cut into the containers. Individual containers may be formed into integral trays or sheets of individual "cells", each cell being optionally detachable from the tray. Alternatively, individual containers can be used together with a separate reusable base tray for additional support as a growing system, as is now common practice when using small peat containers.

One currently preferred form of the invention is a degradation-resistant molded pulp plug propogation tray. Plug propogation trays are used widely in many types of horticulture, including floriculture, agriculture and forestry, for germination and seedling growth. As noted, seed germination and the early growth stages of seedlings must take place under carefully controlled conditions of aeration, light, temperature, moisture and the like to obtain optimum plant growth. These conditions can differ for each growth stage. For this reason, the seeds and seedlings are often started in 10 inch by 20 inch propogation trays having about 50–800 small cells therein, whereby a large number of seedlings can be easily transferred from one growth environment to another and take up only a minumum of space.

By way of example, bedding plants are commercially produced in greenhouses using the plug system, wherein a small ball of growing medium is placed into each cell of a plastic, multi-cell plug propogation tray. Each cell is sowed mechanically with one seed, and the cells are irrigated and fertilizled with automatic misting and injector equipment. During the morphological stages of seed growth [as reported in Hartman et al., *Plant Propogation, Principles and Practices*, 5th Ed., Prentice-Hall (1990): Stage 1=radical emergence; Stage 2=cotyledon spread; Stage 3=unfolding of three or four leaves; Stage 4=more than four leaves] growth conditions are carefully controlled. Normally, at least stages 1 and 2 are very warm and moist. For example, Stage 1 may involve 2–3 days of growth at 80° F. and 100% relative humidity, and at Stage 2, the tray is transferred to a growth environment of 75° F. and 90% relative humidity for 3–14 days. After Stage 4, the developed plugs are dislodged from the tray and placed into retail pots, either mechanically or manually. It is not uncommon for the seedlings to spend up to 30 days in the propogation tray following germination.

Certain disadvantages of a plastic plug propogation tray used in operations of the type described above are overcome when the plug propogation tray is composed of degradation resistant molded pulp fiber. First, the porosity of molded fiber allows more control over aeration and moisture content of the plug than can be achieved using plastic, which is impervious to air and moisture. Moisture control is particularly critical in seed germination. When using a plastic tray, it is often necessary to use a light, free-draining plug medium to permit moisture control of the plug.

Similarly, air exchange is important during germination and early root development. The problems of plastic in terms of moisture and gas impermeability are obviated by the use of molded fiber. It should also be appreciated that, when using a plastic, non-transplantable plug propogation tray, transfer of the seedling to a second pot or to the ground is not possible until the root system is well-developed in the plug. Otherwise, the plant would not survive the transfer. This problem is also overcome using root-penetrable molded fiber, whereby each plug cell may be placed directly into the step-up pot or into the ground without removing the plug from the cell. Accordingly, not only is transplant shock avoided, but it is not necessary to await full or elaborate root development before transfer of the plug.

Another reason that plastic is widely used in plug propogation is its resistance to degradation. Hot, moist and nutrient-rich greenhouse conditions are encountered during germination and early growth-stage environments, and effectively preclude the use of unprotected pulp or peat containers due to degradation and the resultant loss of container strength. When the molded pulp tray contains an effective amount of microbiocide in accordance with this invention, the problem of microbe-induced degradation is overcome. It will thus be appreciated that, in the plug propogation tray embodiment of the invention, the organic thiocyanate is dispersed within the molded fiber, preferably in an amount between 450 and 3000 ppm, and that the fiber may comprise entirely paper pulp or paper pulp modified by the addition of low bond-strength fiber, as described, and that each cell may optionally contain root penetrable openings.

To assess degradation and microbial resistance, containers prepared in accordance with the invention may be stored in the greenhouse environment, such as filled with moist soil and stored in a humid atmosphere under a plastic sheet, or buried in moist, nutrient-rich soil. After the trial period, mold and fungal growth is extensive on untreated or asphalt-based containers and is greatly reduced in accordance with the present invention. The degree of gross structural disintegration can be visually determined. The mechanical strength of the container after the trial burial can be precisely quantitated, for example using the Mullen Burst Test. Using these methods, the containers of the invention have been found to exhibit greatly improved properties in relation to conventional thick-walled or asphalt-based molded pulp containers.

The following examples are intended to illustrate certain aspects of the currently preferred embodiments of the invention and should be construed as illustration and not as in any sense limiting the scope of the invention.

EXAMPLES 1-2 (COMPARATIVE)

In Examples 1 and 2 (Comparative Examples) a news-based furnish was treated by internal addition of a commercial emulsion of copper-8-quinoleate and an asphalt size. Amounts of the fungicidal emulsion added in each furnish were as follows:

Example 1: 5 pounds emulsion/ton of furnish
Example 2: 10 pounds emulsion/ton of furnish In each instance, the treated furnish was used to prepare a molded pulp fiber container by vacuum molding. The containers so prepared were subjected to an accelerated soil burial test which comprises burying the containers in a microbially active soil, such as organic top soil, having a moisture content of about 30%, in an enclosed area in which the temperature is maintained at about 90° F. At different times post-burial, the containers were removed and inspected visually for evidence of microbial growth and analyzed for structural integrity by measuring dry burst strength (in pounds per square inch).

Upon visual inspection, it was apparent that biodegradation was not significantly retarded in the articles prepared using the Example 1 or the Example 2 furnish. Results of the structural strength analysis are shown in Table I.

EXAMPLES 3-5

In Examples 4-5 a news-based furnish comparable to that used in Examples 1 and 2 was treated by internal addition of Busan 1030 dispersion and an asphalt size. In Comparative Example 3, the same furnish was used (with asphalt size) with no microbicide. Amounts of the microbicidal dispersion added in each furnish were as follows:

Example 3: No microbicide
Example 4: 10 pounds dispersion/ton of furnish
Example 5: 20 pounds dispersion/ton of furnish Containers were prepared from each furnish by vacuum molding and were subjected to accelerated soil burial testing as described above. Visual inspection in each instance revealed resistance to microbial growth up to 25 days post-burial. Results of structural strength analysis are shown in Table I.

TABLE I

| | DRY BURST STRENGTH (PSI) AFTER: - DAYS | | | | | |
|---|---|---|---|---|---|---|
| Ex. | 0 days | 10 days | 15 days | 20 days | 25 days | 30 days |
| 1 | 70 | 20 | 9 | 8 | 6 | 6 |
| 2 | 70 | 40 | 12 | 10 | 12 | 4 |
| 3 | 60 | 26 | 10 | 7 | 5 | 5 |
| 4 | 70 | 55 | 50 | 35 | 30 | 20 |
| 5 | 50 | 42 | 42 | 40 | 44 | 51 |

EXAMPLES 6-9

Asphalt-free, No. 6 news-based furnishes were prepared at a pond temperature of 100° F., a consistency of 0.9%, a form time of 3-4 seconds, air time of 5 seconds. The furnishes were charged with the following percentages by weight of Busan 1030 and rosin sizing:

Example 6: No rosin, No Busan 1030
Example 7: No rosin, 20 lbs Busan 1030/ton of furnish
Example 8: 40 lbs rosin, No Busan 1030/ton of furnish
Example 9: 40 lbs rosin, 20 lbs Busan 1030/ton of furnish The furnishes were used to prepare tray-type blocks of connected containers by vacuum molding, and the molded containers were post-cured at 300° F. for 5 minutes. Containers so prepared were subjected to soil burial as described in connection with Examples 1-5 above. At different intervals post-burial, the containers were tested for burst strength, and the results are shown in Table II.

TABLE II

| | DRY BURST STRENGTH (PSI) AFTER - DAYS | | | | | |
|---|---|---|---|---|---|---|
| Ex. | 0 Days | 10 days | 15 days | 20 days | 25 days | 30 days |
| 6 | 38 | 22 | 27 | 20 | 17 | 13 |
| 7 | 33 | 39 | 38 | 36 | 37 | 36 |
| 8 | 42 | 30 | 15 | 7 | 6 | 6 |
| 9 | 46 | 40 | 43 | 42 | 42 | 45 |

The results shown in Table II reflect that the presence of a sizing is not critical to realizing the benefits of the invention.

As a further comparison, a tray-type molded pulp container prepared from the furnish of Example 9 was placed side by side in the greenhouse with an identically-shaped tray-type molded pulp container containing 20% w/w asphalt and no fungicide. After 3 weeks in the greenhouse, the asphalt container was covered by heavy mold growth and had lost all functional strength. The container of Example 9 showed no mold growth and upon informal manual inspection had lost no functional strength. It is noted that, in this context, functional strength does not encompass rigidity, which is always lost to some extent when a molded pulp product is stored in a moist environment.

While the invention has been described in terms of the currently preferred embodiments, those skilled in the art will recognize and appreciate the broader aspects of the invention enabled by this disclosure. As noted above, the optimum quantities of the microbicide for any particular furnish may be determined on the basis of routine testing. The invention is not limited in terms of the components of the furnish, the grade or type of fiber in the furnish, the presence or absence of conventional additives, or the size, shape, style or intended use of the horticultural container.

What is claimed is:

1. A horticultural container composed of molded pulp formed from an aqueous pulp fiber dispersion and containing dispersed within the molded pulp an effective amount of an organic thiocyanate selected from S-thiocyanomethyl compounds of 2-mercaptobenzothiazoles, 2-mercaptobenzoxazoles, or 2-mercaptobenzimidazoles, the organic thiocyanate being provided in the aqueous pulp fiber dispersion and retained in the molded pulp container during formation to control the degradation of said container.

2. The container of claim 1 wherein the organic thiocyanate is 2-(thiocyanomethylthio) benzothiazole.

3. The container of claim 2 containing between 450 and 3000 ppm of the organic thiocyanate.

4. The container of claim 3 containing between 450 and 2000 ppm of the organic thiocyanate.

5. The container of claim 2 additionally containing a sizing.

6. The container of claim 2 additionally containing a retention aid.

7. The container of claim 6 wherein the retention aid is alum.

8. The container of claim 2 additionally containing a wet-strength resin.

9. The container of claim 2 wherein the wall thickness of the container is between 0.03 and 0.1 inches.

10. The container of claim 1 wherein the molded pulp includes low bond strength fibers to facilitate root-penetrability.

11. The container of claim 5, containing less than 5% by weight asphalt as sizing.

12. The container of claim 1, wherein the container is asphalt-free.

13. The container of claim 1, wherein the container is provided with root-penetrable openings.

14. The container of claim 2, wherein the container is provided with root-penetrable openings.

15. A plant propogation tray consisting of a plurality of individual cells, the plant propogation tray being composed of molded pulp fiber formed from an aqueous pulp fiber dispersion and containing dispersed within the molded fiber an effective amount of an organic thiocyanate selected from S-thiocyanomethyl compounds of 2-mercaptobenzothiazoles, 2-mercaptobenzoxazoles, or 2-mercaptobenzimidazoles, the organic thiocyanate being provided in the aqueous pulp fiber dispersion and retained in the molded pulp tray during formation to control the degradation of said container.

16. The plant propogation tray of claim 15 wherein the organic thiocyanate is 2-(thiocyanomethylthio) benzothiazole.

17. The plant propogation tray of claim 16, containing 450-3000 ppm of organic thiocyanate.

18. The plant propogation tray of claim 16 additionally containing a sizing.

19. The plant propogation tray of claim 16 additionally containing a retention aid.

20. The plant propogation tray of claim 16, wherein the tray is asphalt-free.

21. The plant propogation tray of claim 16, wherein the tray is peat-free.

22. The plant propogation tray of claim 16, wherein the molded pulp includes low bond strength fibers to facilitate root-penetrability.

23. The plant propogation tray of claim 16, wherein each cell is provided with at least one root-penetrable opening.

24. The plant propogation tray of claim 16, additionally containing a wet-strength resin.

25. A process for preparing a molded pulp horticultural container which is resistant to microbial degradation, comprising:

a) providing an aqueous fiber dispersion;
   b) combining and admixing with the fiber dispersion a dispersion of an organic thiocyanate to form a dispersion mixture, the organic thiocyanate being selected from S-thiocyanomethyl compounds of 2-mercapto-benzothiazoles, 2-mercaptobenzoxazoles, or 2-mercaptobenzimidazoles; and
   c) forming the dispersion mixture into a molded container, the organic thiocyanate controlling the degradation of said container.

26. The process of claim 26 wherein from 6 to 40 pounds of a 30% dispersion of organic thiocyanate are added per ton of fiber dispersion in forming the dispersion mixture.

27. The process of claim 25, wherein the dispersion mixture contains alum.

28. The process of claim 27, wherein the alum comprises 2% to 4% by weight of the dispersion mixture.

29. The process of claim 25 wherein the organic isothiocyanate is 2-(thiocyanomethylthio) benzothiazole.

30. The process of claim 25, wherein the dispersion mixture contains a retention aid.

31. A horticultural container produced by the process of claim 24.

32. A horticultural container produced by the process of claim 28.

* * * * *